United States Patent [19]

Terauchi et al.

[11] Patent Number: 4,600,367
[45] Date of Patent: Jul. 15, 1986

[54] REFRIGERANT COMPRESSOR FOR AUTOMOBILE AIR-CONDITIONING SYSTEM

[75] Inventors: Kiyoshi Terauchi, Isesaki; Yasuhiro Kubo, Azumamura; Masaharu Hiraga, Honjyo, all of Japan

[73] Assignee: Sanden Corporation, Gunma, Japan

[21] Appl. No.: 597,209

[22] Filed: Apr. 6, 1984

Related U.S. Application Data

[63] Continuation of Ser. No. 319,903, Nov. 10, 1981, abandoned.

[30] Foreign Application Priority Data

Nov. 10, 1980 [JP] Japan ................................ 55-158369

[51] Int. Cl.⁴ ......................... F04B 35/06; B60H 1/32
[52] U.S. Cl. .................................. 417/360; 417/362; 417/364; 62/244
[58] Field of Search ............... 417/360, 364, 362, 231, 417/572; 418/39, 270, 259; 62/244; 254/312, 359; 29/156.4 R

[56] References Cited

U.S. PATENT DOCUMENTS

| | | | |
|---|---|---|---|
| 2,195,834 | 4/1940 | Bilderbeck | 418/259 |
| 2,414,492 | 1/1947 | Urschel et al. | 29/156.4 R |
| 2,540,767 | 2/1951 | Tabbert | 418/39 X |
| 3,385,513 | 5/1968 | Kilgore | |
| 3,476,309 | 11/1969 | Harlin | |
| 3,494,540 | 2/1970 | Dixon | 417/362 X |

FOREIGN PATENT DOCUMENTS 161102 12/1979 Japan .................................. 418/259

Primary Examiner—Cornelius J. Husar
Assistant Examiner—Peter M. Cuomo
Attorney, Agent, or Firm—Banner, Birch, McKie & Beckett

[57] ABSTRACT

A refrigerant compressor for automobile air-conditioning system is disclosed. The compressor comprises a front end plate member and a cylindrical casing attached to an end surface of the front end plate member. A polygonal shaped portion is formed on the outer peripheral surface of the front end plate member and a plurality of projections are formed on an opposite end of the housing from the polygonal shaped portion. The end surfaces of the projections are aligned on the same plane with each end surface of polygonal shaped portion. The end surfaces of the projections and the polygonal shaped portion have tapped holes for attaching mounting brackets. Therefore, a variety of suitable mounting arrangements can be used to mount the compressor and the mounting angle of the compressor can be adjusted.

5 Claims, 10 Drawing Figures

REFRIGERANT COMPRESSOR FOR AUTOMOBILE AIR-CONDITIONING SYSTEM

This application is a continuation of application Ser. No. 319,903, filed Nov. 10, 1981, now abandoned.

BACKGROUND OF THE INVENTION

This invention relates to a refrigerant compressor, and more particularly to the mounting of such a compressor in an automobile air-conditioning system.

A compressor which is used in an automobile air-conditioning system is usually mounted on the engine of the automobile through a suitable mounting bracket. Various mounting arrangements are well known such as a swingable mounting type, a fixed mounting with an idler pulley, a fixed belt type, etc. However, there are various types of refrigerant compressors and the outward form of each type is different. Therefore, a particular mounting arrangement for such compressors can generally be applied to only one or two types of compressors.

A normal mounting arrangment generally comprises a projection extending radially from the housing of the compressor and at least one bracket. The bracket is fixed on the engine and the compressor is fixed on the bracket by bolts. The compressor is thus mounted on the engine through the bracket.

However, such projections of the compressor are generally formed on the end portion of the housing of the compressor and placed on the bracket fixed to the engine. Therefore, a specified mounting bracket for each type of engine is needed to mount the compressor. Because automobiles use various types of engines, and parts within an engine compartment are arranged in various manners, the space within various engine compartments for mounting the compressor will be different. A different bracket configuration is thus needed for each type of engine.

In the case where various types of brackets must be manufactured and the amount of each type which is manufactured is small, the cost of the bracket increases and care of the bracket is complicated.

SUMMARY OF THE INVENTION

It is an object of this invention to provide an improvement in a refrigerant compressor for an automobile air-conditioning system including a mounting for attachment of the compressor to a suitable support in a secure and easy fitting manner.

It is another object of this invention to provide an improvement in a refrigerant compressor for an automobile air-conditioning system which can be mounted on an engine through any suitable mounting bracket at any suitable angle.

The refrigerant compressor for automobile air-conditioning system according to this invention includes a housing having a front end plate member and a casing connected to an end surface of the front end plate member. A polygonal shaped mounting portion is formed on a front end portion of the housing. A fixed mounting portion is formed on the opposite end portion of the housing. Each outwardly facing end surface of the fixed portion is aligned on the same plane with an opposed outwardly facing end surface of the polygonal shaped portion. Tapped holes for fixing a mounting bracket are formed in the fixed portion and in the polygonal shaped portion.

In one embodiment of this invention, the polygonal shaped mounting portion is formed on the outer peripheral surface of the front end plate member. A plurality of projections extend radially from the outer peripheral surface of the casing at the rear end portion of the casing and serve as the fixed mounting portion.

In another embodiment of this invention, the fixed mounting portion is comprised of a polygonal shaped member which is fixed on the outer peripheral portion of the casing. The fixed mounting portion is thus formed by the polygonal shaped member.

Further objects, features and other aspects of this invention will be understood from the following detailed description of preferred embodiments of this invention referring to the annexed drawings.

DETAILED DESCRIPTION OF THE PREFERRED EMBODIMENTS

Figure 1:
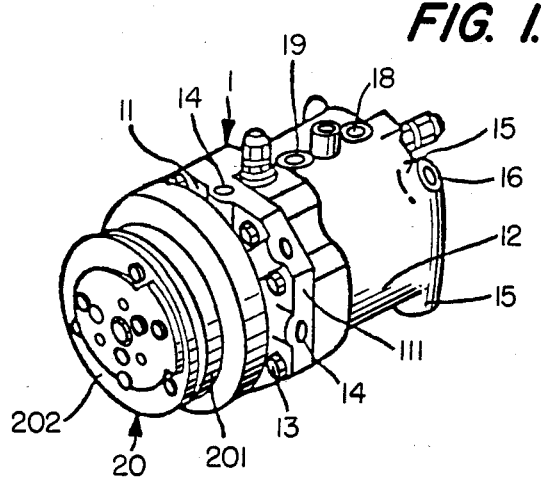
FIG. 1 is a perspective view of a compressor according to one embodiment of this invention.

Referring to FIG. 1, a refrigerant compressor 1 for an automobile air-conditioning system constructed in accordance with the present invention is shown. Compressor 1 comprises a front end plate member 11 and a cup-shaped casing 12 which faces an end surface of front end plate member 11 and is fixed to the front end plate member 11 by a plurality of bolts 13. Cup-shaped casing 12 preferably has a generally cylindrical outer surface. The front end plate member 11 has an octagonal shaped portion 111 formed on the outer peripheral surface thereof. The octagonal shaped portion 111 has a plurality of outwardly facing flat faces which are continuously joined to one another. The flat faces have tapped holes 14 formed in each end surface thereof. The rear end portion of casing 12 has a plurality of projections 15 extending radially from the outer peripheral surface of casing 12. A tapped hole 16 is formed in each end surface of projections 15. Each projection 15 is located opposite one of the flat faces of octagonal shaped portion 111 so that the projections 15 and the faces of octagonal shaped portion 111 are arranged in pairs aligned along lines extending in the lengthwise direction of the compressor 1. Each projection 15 is thus aligned in a longitudinal direction of casing 12 with a respective one of the flat faces of octagonal shaped portion 111. The end surface of each projection 15 is aligned on the same plane with an opposed respective end surface of octagonal shaped portion 111.

Figure 2:
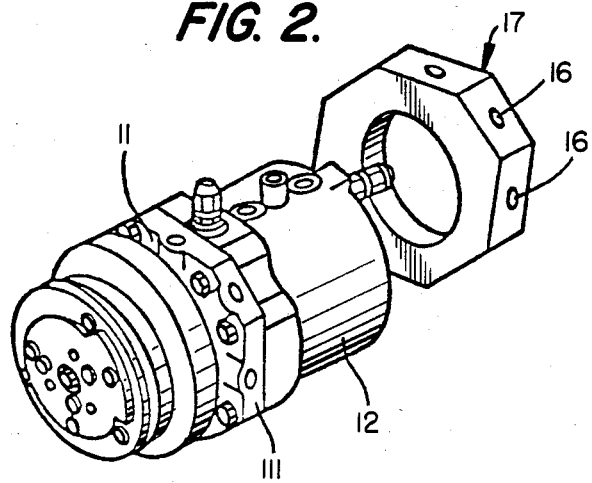
FIG. 2 is a perspective view of a compressor according to another embodiment of this invention.

Alternatively, these projections can be formed as an octagonal shaped member 17. Member 17 can be formed separately from casing 12 and attached to casing 12, as shown in FIG. 2, or can be formed integral with casing 12.

Figure 3A:
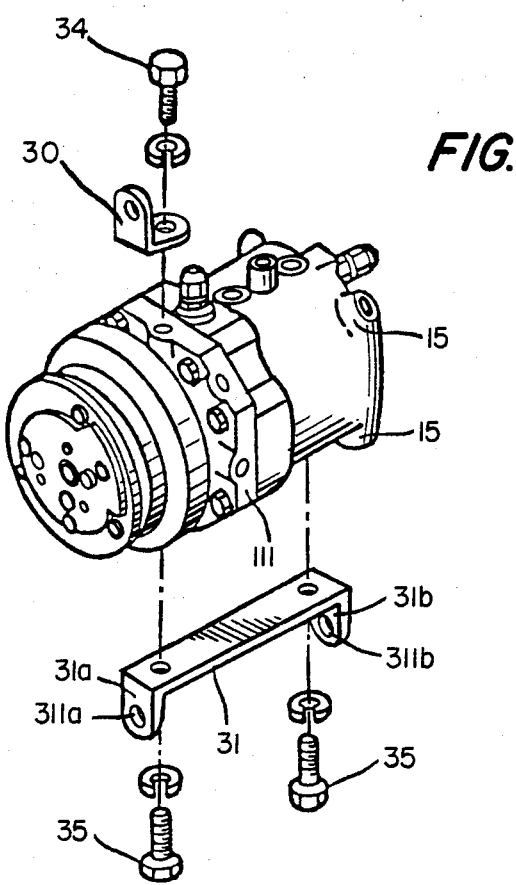
FIG. 3(a) is an exploded perspective view illustrating a swingable type mounting arrangement.
Figure 3B:
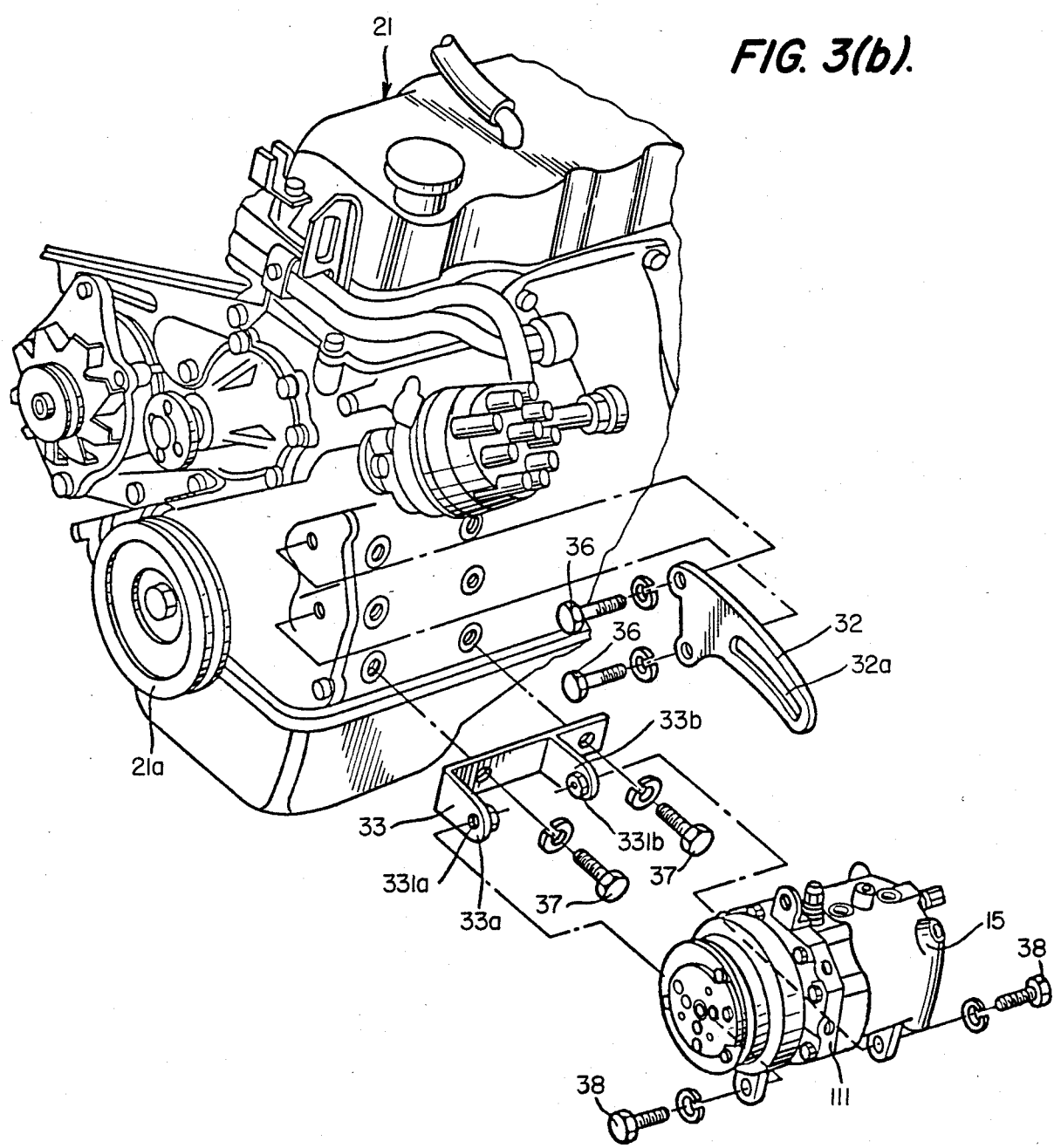
FIG. 3(b) is an exploded perspective view illustrating a swingable type mounting arrangement adjacent an engine.

A discharge port 18 and a suction port 19 are formed on the casing 12 to communicate with the air-conditioning system. Front end plate member 11 has an annular sleeve portion (not shown). An electromagnetic clutch 20 is carried on the annular sleeve portion and an end portion of a drive shaft (not shown) of the compressor is selectively coupled to the electromagnetic clutch 20. Electromagnetic clutch 20 comprises a pulley 201, a magnetic coil (not shown) and an armature plate 202 flexibly fixed on the drive shaft. Pulley 201 is rotatably supported by the annular sleeve portion through a bearing and is coupled to a pulley 21a of engine 21 through a V-Belt (FIG. 3). The compressor is thus driven by the output of engine 21 through magnetic clutch 20. The compressed fluid flows out from the compressor, circulates through the air-conditioning system and returns to the compressor.

Referring to FIGS. 3–6, various mounting arrangements for compressor 1 will be described. FIG. 3 illustrates a swingable type mounting arrangement.

In the swingable type mounting arrangement, the mounting components comprise four parts, such as an L-shaped bracket 30, a fixed sub-bracket 31, an arm-shaped bracket 32, and a fixed bracket 33. The L-shaped bracket 30 has holes at each end surface and is fixed on the upper flat face of octagonal shaped portion 111 by a bolt 34. The fixed sub-bracket 31 has flange portions 31a, 31b at both its end portions. A hole 311a, 311b is formed through each flange portion 31a, 31b. The fixed sub-bracket 31 extends over the lower portion of compressor 1 and is fixed on the lower flat face of octagonal shaped portion 111 and one of projections 15 by bolts 35. The arm-shaped bracket 32 has an arc-shaped hole 32a and is fixed to the engine 21 by bolts 36. The fixed bracket 33 is fixed on the engine 21 by a plurality of bolts 37. Projections 33a, 33b extend radially from fixed bracket 33 and have holes 331a, 331b. The distance between the projections 33a and 33b is the same as the distance between flanges 31a and 31b of fixed sub-bracket 31. The fixed sub-bracket 31 extends over the fixed bracket 33 and is connected to the fixed bracket 33 by bolts-nuts 38. The arc-shaped hole 32a of arm-shaped bracket 32 opposes the hole of L-shaped bracket 30 and is connected thereto by a bolt-nut. The compressor is thus mounted on the engine.

The bolt which connects the L-shaped bracket 30 to the arm-shaped bracket 31 can be moved within the arc-shaped hole. Therefore, if the bolts-nuts 38 are loosely fitted, the compressor can swing around the projections 33a, 33b of bracket 33. The belt tension can thus be adjusted by the swing motion of compressor 1.

Figure 4:
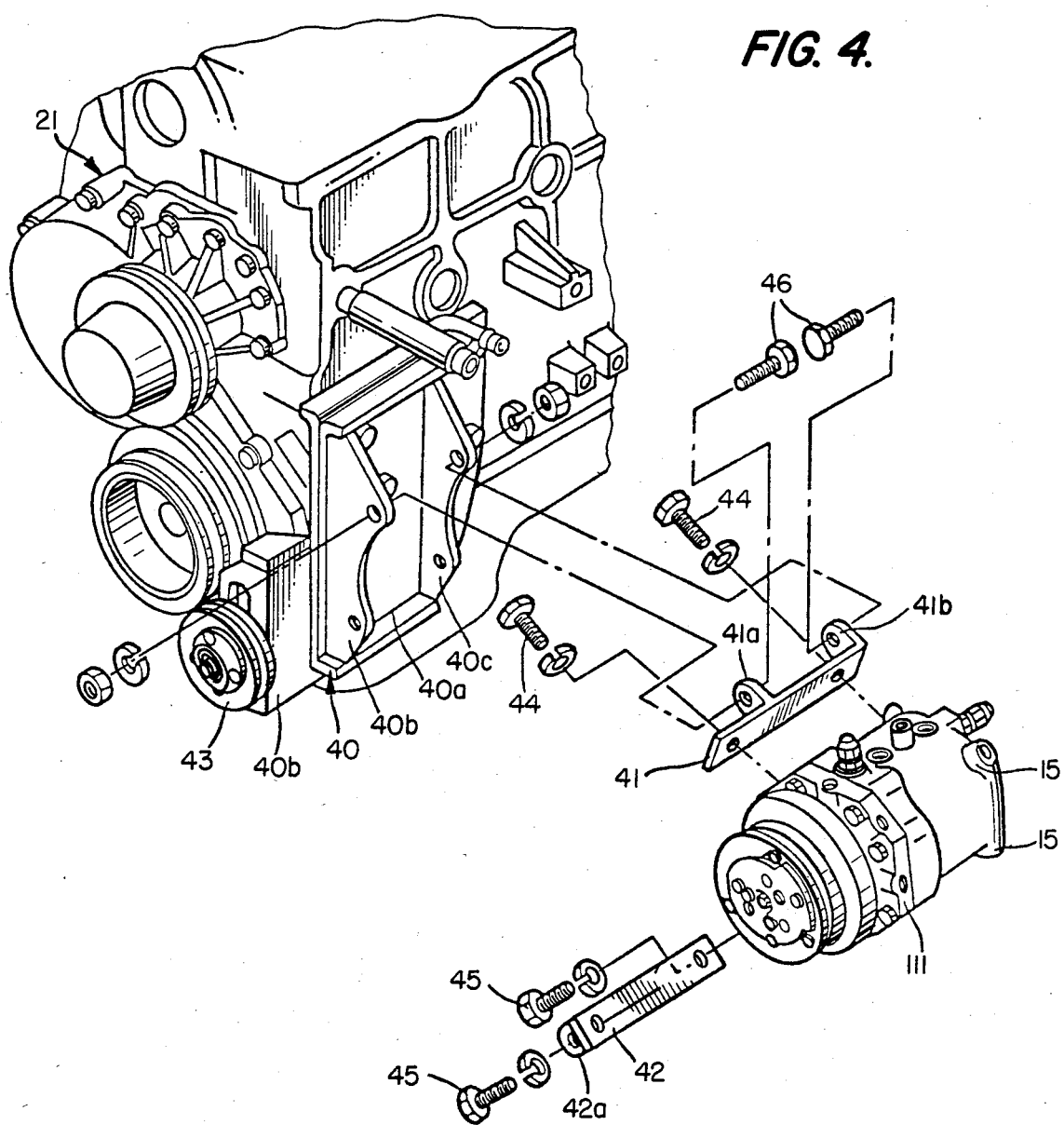
FIG. 4 is an exploded perspective view illustrating a fixed mounting with an idler pulley type mounting arrangement.

FIG. 4 illustrates a fixed mounting with an idler pulley type mounting arrangement.

In the idler pulley type mounting arrangement, the mounting components comprise a fixed bracket 40 and two sub-brackets 41, 42. Fixed bracket 40 has a flat plate portion 40a fixed on the engine 21, a pair of projections 40b, 40c projecting from the flat plate portion 40a parallel with one another, and a support member 40d on which an idler pulley 43 is movably supported for adjusting the belt tension.

Both end portions of sub-brackets 41, 42 have a pair of radial flanges 41a, 41b, 42a and 42b extending radially from the sub-brackets 41, 42. One of sub-brackets 41 extends over the upper side surface of compressor 1 and is fixed on one flat face of octagonal shaped portion 111 and one of projections 15 by bolts 44. The other sub-bracket 42 extends over the lower side surface of compressor 1 and is fixed on one flat face of octagonal shaped portion 111 and one of the projections 15 by bolts 45. The radial flanges of both sub-brackets 41, 42 are fitted against the projections 40b, 40c of fixed bracket 40 and fixed on the fixed bracket 40 by bolts-nuts 46. The compressor 1 is thus mounted on the engine 21.

Figure 5A:
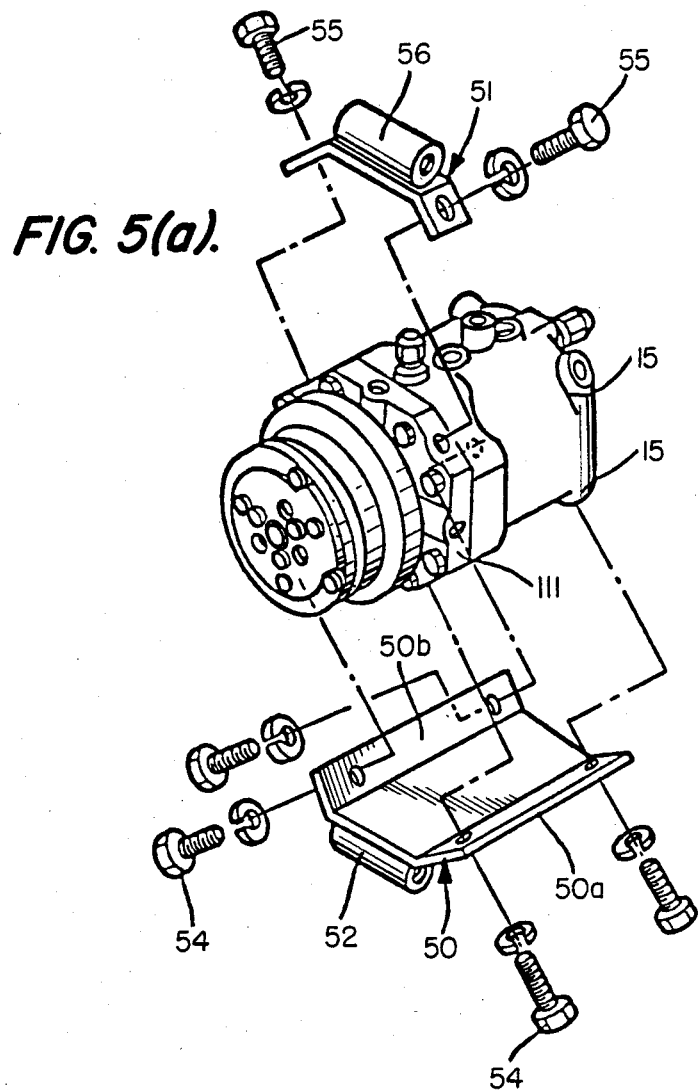
FIG. 5(a) is an exploded perspective view illustrating a straight through bolt type mounting arrangement.
Figure 5B:
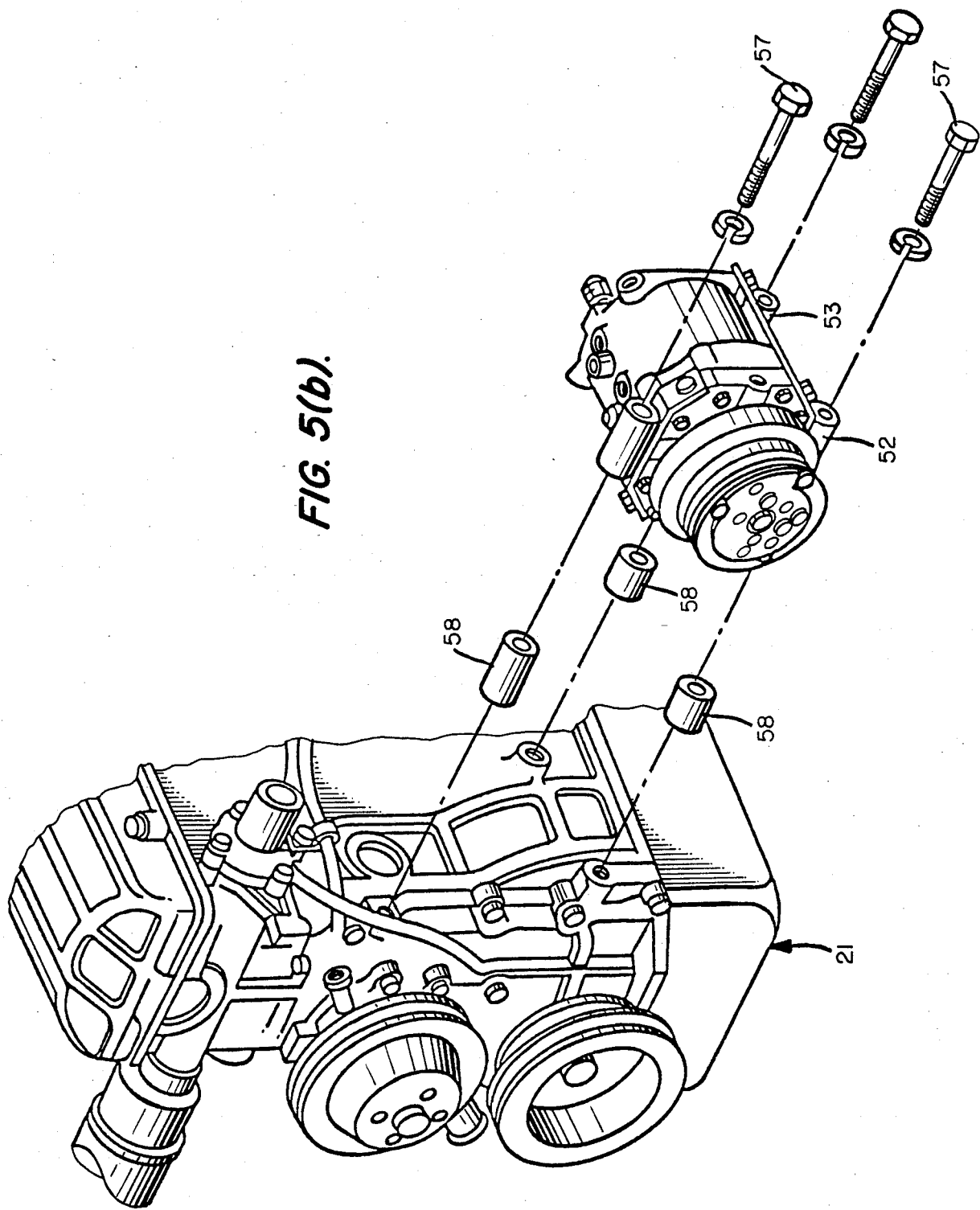
FIG. 5(b) is an exploded perspective view illustrating a straight through bolt type mounting arrangement adjacent an engine.

FIG. 5 illustrates a straight through bolt type mounting arrangement.

In the straight through bolt type mounting arrangement, the mounting components comprise a support bracket 50 and a sub-bracket 51. The support bracket 50 has radial flanges 50a, 50b along both side surfaces thereof and two tubular fixed members 52, 53. Member 52 is fixed at the front end portion of support bracket 50, and member 53 is fixed at the rear end portion of support bracket 50. The support bracket 50 extends over the lower portion of compressor 1 and is fixed on the octagonal shaped portion 111 and projection 15 by bolts 54. Both end portions of sub-bracket 51 are bent to follow the shape of octagonal shaped portion 111 and fixed on upper flat faces of octagonal shaped portion 111 by bolts 55. The upper surface of sub-bracket 51 has a tubular fixed member 56.

The compressor is fixed on the engine 21 by a plurality of straight bolts 57 which penetrate through the tubular fixed members 52, 53, 56 and through spacers 58.

Figure 6A:
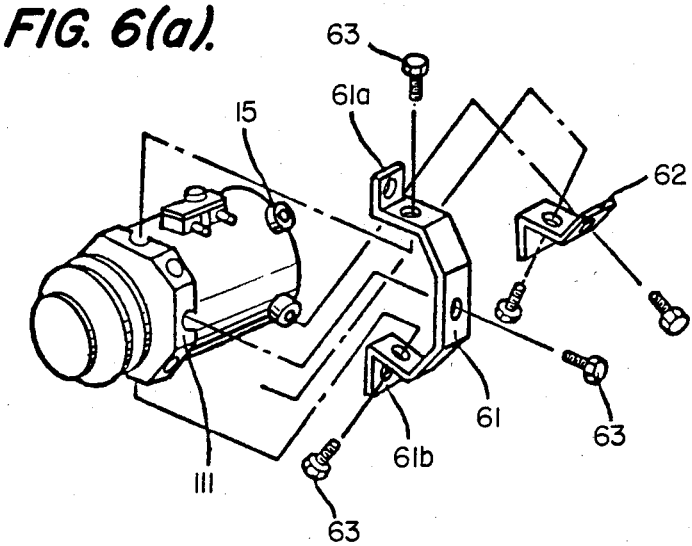
FIG. 6(a) is an exploded perspective view illustrating a fixed belt type mounting arrangement.
Figure 6B:
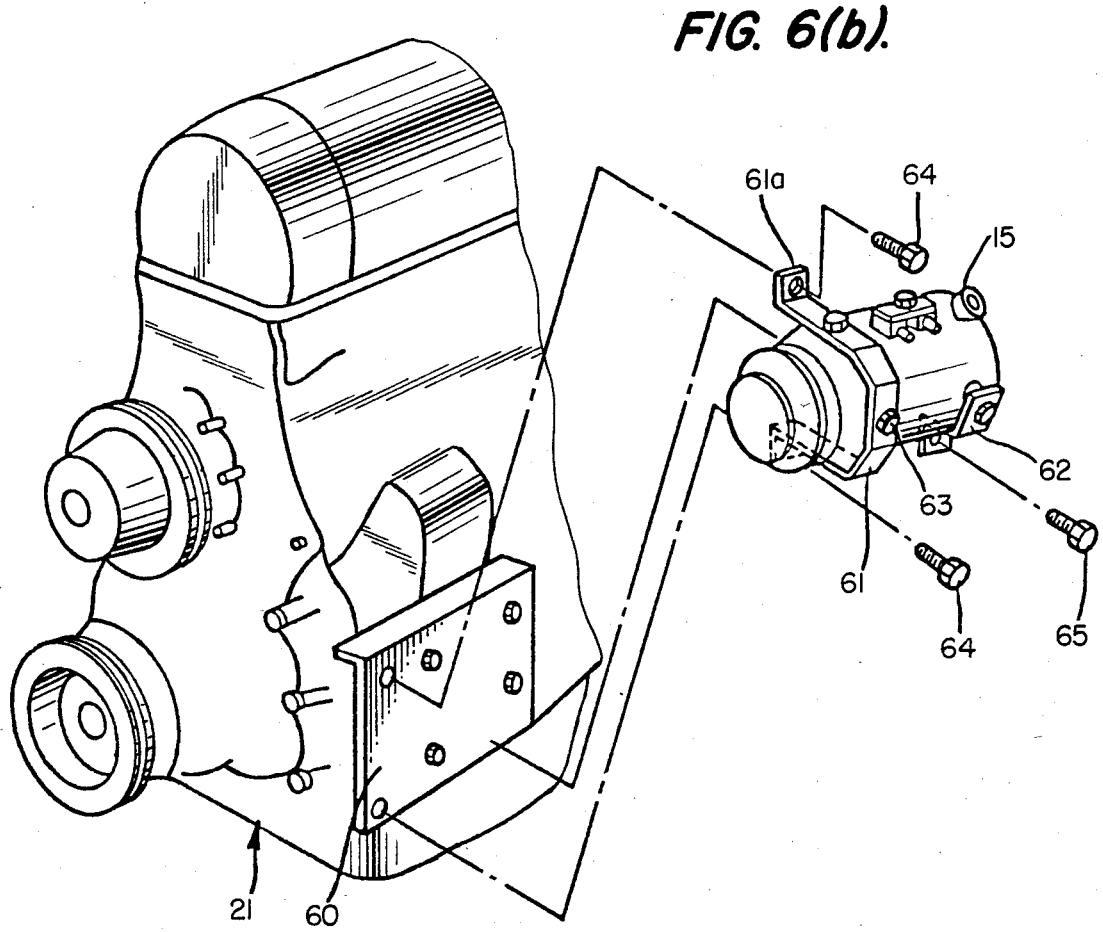
FIG. 6(b) is an exploded perspective view illustrating a fixed belt type mounting arrangement adjacent an engine.

FIG. 6 illustrates a fixed belt type mounting arrangement.

In the fixed belt type mounting arrangement, the mounting components comprise a plate type bracket 60 fixed on the engine 21, a belt type bracket 61 and a support bracket 62. The belt type bracket 61 is bent to follow the outer configuration of octagonal shaped portion 111. The belt type bracket 61 therefore extends over the outer surface of octagonal shaped portion 111 and is fixed on the octagonal shaped portion 111 by bolts 63. Both end portions of belt type bracket 61 have flanges 61a, 61b. Each flange 61a, 61b has a hole. The belt type bracket 61 is therefore fixed on the plate type bracket 60 by bolts 64. Both end portions of support bracket 62 are bent and are connected to one another by a central flat portion. One of the bent portions is fixed on one of the projections 15. The other bent portion of support bracket 62 is fixed on the plate type bracket 60 by a bolt 65. The compressor is thus mounted on the engine 21 through brackets 60, 61, 62.

Figure 7:
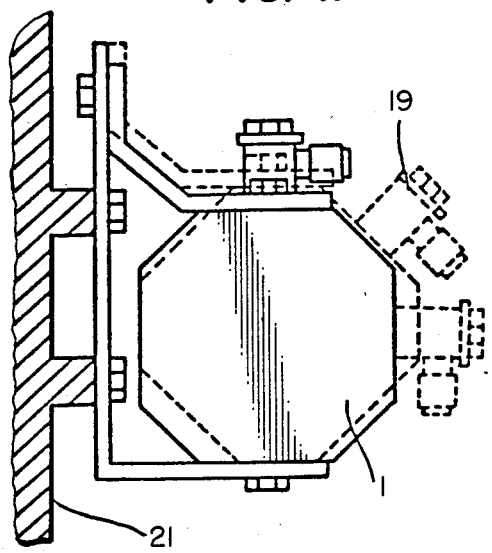
FIG. 7 is a schematic front view of a mounting arrangement illustrating changing of the mounting angle of a compressor.

The compressor 1 has a polygonal shaped portion 111 having a plurality of continuously joined flat faces and projections 15 aligned with the faces of the polygonal shaped portion 111 at the opposite end portion of the housing. Therefore, brackets for mounting the compressor 1 can be fixed to any portion of the polygonal shaped portion and projections. If the fixed portion of the mounting brackets is shifted (i.e., rotated), the mounting angle of the compressor can be easily changed, and the position of the discharge and suction ports of the compressor can be easily selected for the particular engine compartment, as shown in FIG. 7.

As mentioned above, the compressor in accordance with this invention has a polygonal shaped fixed portion for attaching the mounting bracket. Therefore, any suitable mounting arrangement which fits to the configuration of the engine can be used for mounting the compressor. The attachment of the compressor is thus easily accomplished.

Furthermore, the mounting angle is easily adjusted by shifting the fixed portion of the brackets. Therefore, the ports formed on the housing are easily located to communicate with the air-conditioning system.

This invention has been described in detail in connection with preferred embodiments, but these are for example only and this invention is not restricted thereto. It will be easily understood by those skilled in the art that variations and modifications can be easily made without departing from the scope of this invention.

We claim:

1. in a refrigerant compressor for an automobile air-conditioning system, a housing comprising a front end plate member and a separate casing removably connected to an end surface of said front end plate member, a fluid inlet port and a fluid outlet port being formed at fixed locations on said casing, means for adjusting the mounting angle of said compressor to accommodate the connection of said fluid inlet and outlet ports to the air-condition system in various engine compartments, said adjusting means including a polygonal shaped mounting portion with a plurality of first tapped holes and a plurality of second tapped holes, said polygonal shaped mounting portion being formed on one of said front end plate member and said casing and having more than five outwardly facing flat faces each disposed along a different plane, one of said first tapped holes being formed in each of said faces, the other of said front end plate member and said casing having said plurality of second tapped holes to be aligned with the tapped holes formed in said faces whereby the mounting angle of the compressor can be easily adjusted by the rotation of said compressor to rotatively position said faces and said ports.

2. The compressor of claim 1 wherein said polygonal shaped mounting portion is formed on the outer surface of said front end plate member.

3. The compressor of claim 1 or 2 wherein said second tapped holes are formed in a plurality of projections extending radially from said casing.

4. The compressor of claim 1 or 2 wherein said second tapped holes are formed in a polygonal shaped member.

5. The compressor of claim 4 wherein said polygonal shaped member is formed integral with said casing.

* * * * *